US012581197B2

(12) United States Patent
Wendling

(10) Patent No.: US 12,581,197 B2
(45) Date of Patent: *Mar. 17, 2026

(54) EXTENDED SCENE VIEW

(71) Applicant: NAGRAVISION SARL,
Cheseaux-sur-Lausanne (CH)

(72) Inventor: Bertrand Wendling,
Cheseaux-sur-Lausanne (CH)

(73) Assignee: NAGRAVISION SARL,
Cheseaux-sur-Lausanne (CH)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/827,343

(22) Filed: Sep. 6, 2024

(65) Prior Publication Data

US 2025/0071427 A1    Feb. 27, 2025

Related U.S. Application Data

(63) Continuation of application No. 18/332,007, filed on
Jun. 9, 2023, now Pat. No. 12,114,077, which is a
(Continued)

(30) Foreign Application Priority Data

Aug. 10, 2017    (EP) ..................................... 17185811

(51) Int. Cl.
| | |
|---|---|
| *H04N 23/698* | (2023.01) |
| *G06T 3/067* | (2024.01) |
| *G06T 3/4038* | (2024.01) |
| *H04N 21/2368* | (2011.01) |
| *H04N 21/434* | (2011.01) |
(Continued)

(52) U.S. Cl.
CPC ........... *H04N 23/698* (2023.01); *G06T 3/067*
(2024.01); *G06T 3/4038* (2013.01); *H04N*
*21/4341* (2013.01); *H04N 21/44016* (2013.01);
*H04N 21/4728* (2013.01); *H04N 21/2368*
(2013.01)

(58) Field of Classification Search
CPC ............. H04N 23/698; H04N 21/4341; H04N
21/44016; H04N 21/4728; G06T 3/067;
G06T 3/4038
See application file for complete search history.

(56) References Cited

U.S. PATENT DOCUMENTS

| | | | |
|---|---|---|---|
| 2009/0113505 A1* | 4/2009 | Yu ...................... | H04N 21/2668<br>725/114 |
| 2013/0247080 A1* | 9/2013 | Vinson ............. | H04N 21/44213<br>725/14 |

* cited by examiner

*Primary Examiner* — On S Mung
(74) *Attorney, Agent, or Firm* — POLSINELLI LLP

(57) ABSTRACT

The disclosure provides methods and content consumption
devices that enable a scene, for example a 360° scene, that
is larger (i.e. has more pixels in at least one dimension) than
a display format of the content consumption device to be
displayed. Constituent scene views are received individually
by the content consumption device, for example as broad-
casts, and are combined, for example stitched together, at the
content consumption device to output a part of the scene that
fits in the display format. The part of the scene (and hence
the required constituent streams) to be displayed are deter-
mined by a signal, for example a navigational input from a
user, enabling the user to navigate in the scene. By, for
example, receiving a limited number of scene streams based
on the scene streams required to produce the view that fits
in the display format based on the signal, bandwidth require-
ments to view and navigate within the scene.

20 Claims, 9 Drawing Sheets

Related U.S. Application Data continuation of application No. 17/405,057, filed on Aug. 18, 2021, now Pat. No. 11,716,540, which is a continuation of application No. 16/050,973, filed on Jul. 31, 2018, now Pat. No. 11,108,952.

(51) Int. Cl.
H04N 21/44          (2011.01)
H04N 21/4728          (2011.01)

Stream 1;   right  4
            ; left  2
            ; above void
            ; below void
Stream 2; right  1
            ; left  3
            ; above void
            ; below void
Stream 3; right  2
            ; left  4
            ; above void
            ; below void
Stream 4; right  3
            ; left  1
            ; above void
            ; below void Stream 1;   right   4
         , left   2
         ; above   5
         ; below void
Stream 2; right   1
         ; left   3
         ; above   6
         ; below void
Stream 3; right   2
         ; left   4
         ; above   7
         ; below void
Stream 4; right   3
         ; left   1
         ; above   8
         ; below void Stream 5;   right   8
         , left   6
         ; above void
         ; below   1
Stream 6; right   5
         ; left   7
         ; above void
         ; below   2
Stream 7; right   6
         ; left   8
         ; above void
         ; below   3
Stream 8; right   7
         ; left   5
         ; above void
         ; below   4

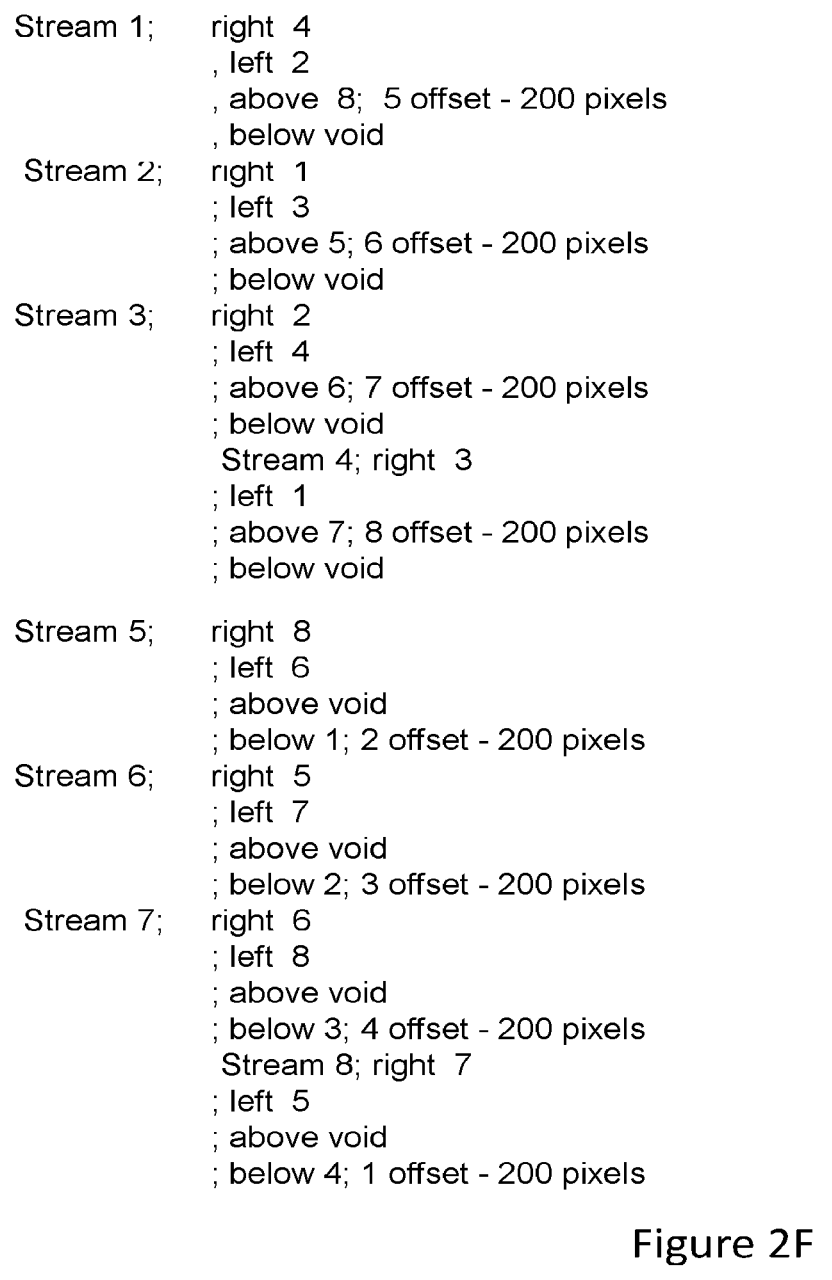

Stream 1;    right  4
                , left  2
                , above  8;  5 offset - 200 pixels
                , below void
Stream 2;    right  1
                ; left  3
                ; above 5; 6 offset - 200 pixels
                ; below void
Stream 3;    right  2
                ; left  4
                ; above 6; 7 offset - 200 pixels
                ; below void
                Stream 4; right  3
                ; left  1
                ; above 7; 8 offset - 200 pixels
                ; below void Stream 5;    right  8
                ; left  6
                ; above void
                ; below 1; 2 offset - 200 pixels
Stream 6;    right  5
                ; left  7
                ; above void
                ; below 2; 3 offset - 200 pixels
Stream 7;    right  6
                ; left  8
                ; above void
                ; below 3; 4 offset - 200 pixels
                Stream 8; right  7
                ; left  5
                ; above void
                ; below 4; 1 offset - 200 pixels

Figure 2F

EXTENDED SCENE VIEW

CROSS-REFERENCES TO RELATED APPLICATIONS

This application is a continuation of U.S. patent application Ser. No. 18/332,007 filed Jun. 9, 2023, which is a continuation of U.S. patent application Ser. No. 17/405,057 filed Aug. 18, 2021, which is a continuation of U.S. patent application Ser. No. 16/050,973 filed Jul. 31, 2018, which claims the priority benefit of European Patent Application No. 17185811.1, filed on Aug. 10, 2017, all of which are incorporated herein by reference in their entirety for all purposes.

FIELD

The present disclosure relates to processing of video streams combinable to display portions of a scene, in particular processing of video streams that can be stitched together into a scene that corresponds to a larger field of view than the individual fields of view of the individual streams, for example a 360° surround view or 360°×180° dome view.

BACKGROUND

Techniques for creating large fields of views from individual camera views are known, for example stitching software to stitch together up to 32 camera views (VR Works 360 Video SDK, see https://blogs.nvidia.com/blog/2016/07/25/360-degree-video-stitching/, incorporated herein by reference) or stitching views into a half dome within a single 4K video stream to be displayed in 360° mode with a Virtual Reality (VR) helmet (VideoStitch, https://www.orah.co/news/how-360-video-works/, incorporated herein by reference). Stitched scenes of this kind typically involve large high resolution frames that require significant bandwidth to transmit, in particular if the stream is to be transmitted "live" in real time. This limits the contexts in which, and equipment with which, such stitched scenes can be viewed. It would be desirable to enable viewing of such "surround" scenes in contexts where this is not currently possible.

BRIEF DESCRIPTION OF THE DRAWING

Some specific embodiments are described below to illustrate aspects and principles of the disclosure by way of example and with reference to the accompanying drawings, in which:

FIGS. 2A-C illustrate surround scenes split into scene video streams;

FIGS. 2D-F illustrate respective data structures identifying scene video streams for each constituent stream;

DETAILED DESCRIPTION

Figure 1:
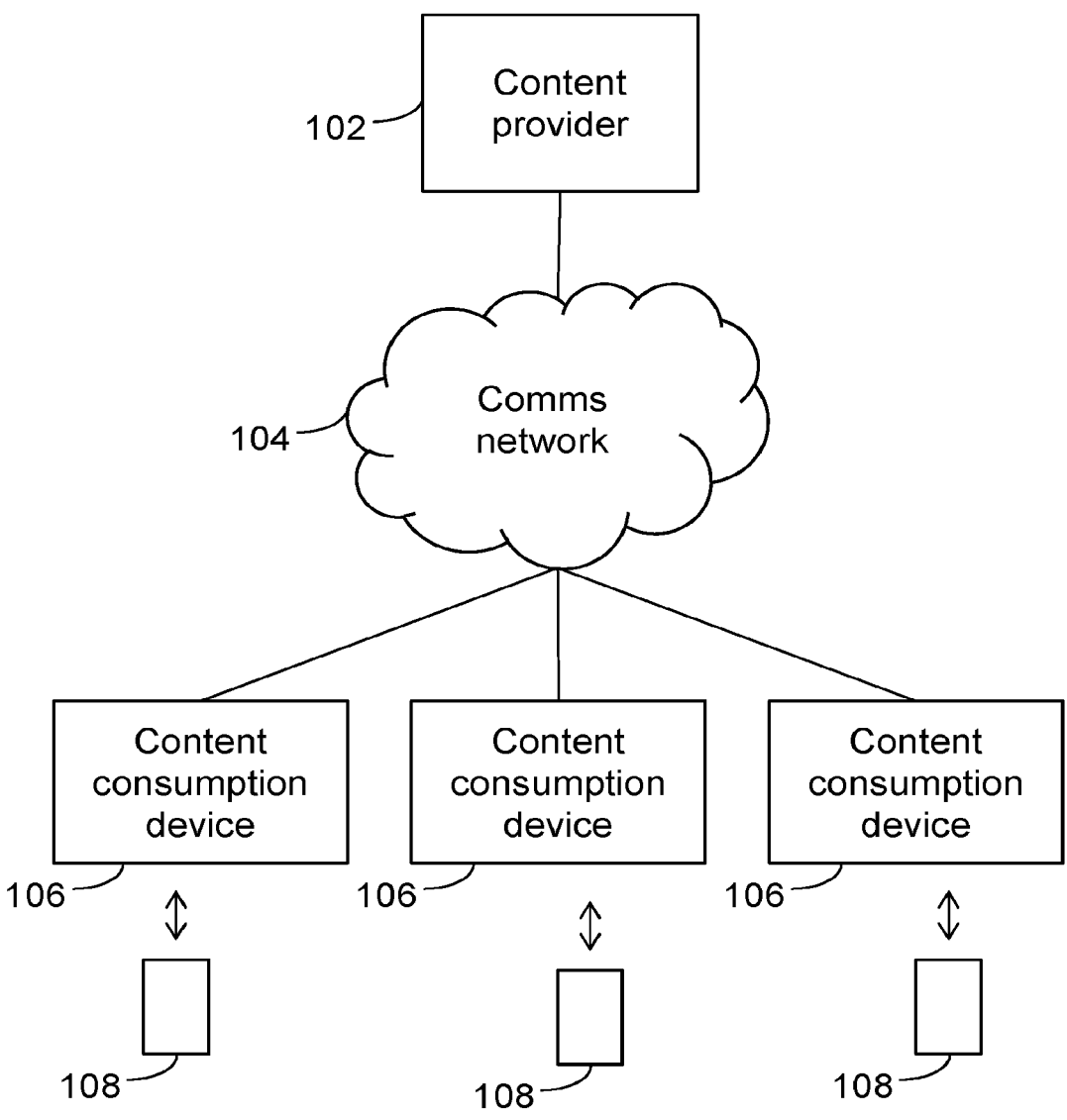
FIG. 1 illustrates a content distribution system.

In overview, aspects of the disclosure provide methods and content consumption devices that enable a scene, for example a 360° scene, that is larger (i.e. has more pixels in at least one dimension) than a display format of the content consumption device to be displayed. Constituent scene views are received individually by the content consumption device, for example as broadcasts, and are combined, for example stitched together, at the content consumption device to output a part of the scene that fits in the display format. The part of the scene (and hence the required constituent streams) to be displayed are determined by a signal, for example a navigational input from a user, enabling the user to navigate in the scene. By, for example, receiving a limited number of scene streams based on the scene streams required to produce the view that fits in the display format, bandwidth requirements to view and navigate within the scene can be reduced.

In some aspects, a method of processing video streams at a content consumption device is disclosed, for example at a set-top-box; a smart television; a desktop or portable computer; generally a computing device; a virtual or augmented reality device; a head mounted display device; a virtual reality helmet or virtual reality goggles or the like. The method comprises receiving two or more video streams of a plurality of video streams. Each of the plurality of video streams corresponds to a respective stream portion of a scene and the plurality of video streams are combinable into a combined stream corresponding to the scene. For example, the scene may comprise one row or two or more rows of stream portions spanning a viewing angle or field of view of the scene. Thus the fields of view of the scene streams combine to provide the field of view of the scene.

The method further comprises receiving a signal indicating an output portion of the scene to be output by the content consumption device. The output portion has less pixels in at least one dimension than the scene. The two or more video streams are combined to produce an output video stream corresponding to the output portion and the output video stream is output, for example outputting a video signal that can be displayed on a display device, displaying or causing displaying of the output video stream on a display, separate or part of the content consumption device, for example a VR helmet or goggles, a television or other display screen or the like. Output may be wirelessly, for example over a WIFI local area network connection or via Bluetooth™. The output portion may correspond to a field of view of a display device of or connected to the content consumption device, for example having the same height and width in pixels as the display device. The signal may indicate a position of the output portion within the scene, for example a corner or centre coordinate, height and width of the output portion in pixels or another unit, or an indication of direction and number of pixels by which to scroll/displace the output portion in the scene. Numerous other types of signals are equally possible. In particular, height and width may be preset for the content consumption device, or a specific format used by it, and may not be part of the signal.

Advantageously, by assembling the portion of the scene to be displayed from the scene streams at the content consumption device, only some of the scene streams can be received, rather than a stream corresponding to the full scene. As a result the bandwidth that is required to present the scene to a viewer so that the viewer can navigate within the scene using a display that is smaller than the scene is reduced, as only a portion of the scene needs to be received at any one time. This is particularly pertinent, it will be appreciated, where the scene corresponds to a live view and is transmitted in real time but the benefit accrues, equally, where the scene corresponds to a pre-recorded video.

In some embodiments, the method comprises determining two or more video streams corresponding to a respective overlapping portion of the scene, overlapping the output portion, and selectively receiving the two or more determined video streams. Selectively receiving the two or more determined video streams may comprise receiving only the two or more determined video streams; receiving a subset comprising the two or more determined video streams, for example those video streams included in one or more multiplexes that each carry one or more of the two or more determined video streams; the two or more determined video streams and adjacent video streams, and so forth. It will be understood that selectively receiving the two or more determined video stream corresponds to receiving some but not all of the plurality of video streams or receiving the two or more determined video streams, possibly adjacent or otherwise related video streams but not all of the plurality of video streams. In other embodiments, the two or more video streams are determined and combined after receiving some or all of the plurality of video streams. Advantageously, by selectively receiving the two or more determined video streams, the bandwidth can be targeted where it is needed most.

In some embodiments, the two or more video streams are broadcast, for example in a cable, satellite, over-the-air or internet broadcast. In some embodiments, selectively receiving the two or more determined video streams comprises receiving a respective broadcast of each of the two or more determined video streams. This may comprise tuning to a respective channel for each stream, tuning to one or more channels to receive a respective one or more multiplexes comprising the respective video streams, and so forth. In some embodiments, at least one of the plurality of video streams is broadcast on a first broadcast channel and at least one other of the plurality of video streams is broadcast on a second broadcast channel different from the first broadcast channel. It will be understood that each channel may correspond to a specific carrier frequency and/or may carry a multiplex of video streams or services. In some embodiments, the streams are MPEG-2 streams, for example with the multiplexes being Transport Streams (TS) each comprising a plurality of Elementary Streams (ES). In some embodiments, selectively receiving the two or more determined video streams comprises requesting the two or more determined video streams from a server.

In some embodiments, the signal indicating an output portion is received from a user input device, for example a remote control via numeric or navigational keys, a smart phone or tablet linked to content consumption device, a touch screen of a display device of or connected to the content consumption device, a pointing device; a gaze tracking and/or head orientation tracking device, a virtual reality helmet or virtual reality goggles, and the like. In some embodiments, the signal may be generated internally, that is not in response to a user input, for example the signal may be arranged to scroll the output portion across the scene at a fixed or variable rate.

The method may, in some embodiments, comprise receiving data identifying the plurality of video streams as related to the scene and, for each video stream, one or more adjacent video streams adjacent in the scene to the video stream. For example, the data may be received together with or embedded in each video stream or multiplex containing the video stream. For example, the data may be provided in one or more Digital Video Broadcast (DVB) or other digital broadcast tables, for example coded in user defined descriptors of Service Description Tables (SDT) or Event Identification Tables (EIT) in a TS multiplex in accordance with the DVB standard, or in each Program Map Table (PMT) of the TS multiplex defined in the MPEG 2 standard. In some embodiments, each multiplex includes data identifying adjacent video streams for any of the plurality of the streams in the multiplex or each video stream has data associated with it that identifies adjacent video streams, for example identifying the relevant ES by a corresponding Packed Identifier (PID). In each case, the data identifies constituent scene video streams and where they can be found, for example identifying the video stream by a service id, program number or PID. For example, each stream may have embedded in it information on its adjacent video streams.

In some further aspects, a content consumption device is disclosed. The device comprises a receiver, for example a broadcast receiver or Internet Protocol (IP) data communications interface, for receiving two or more video streams of a plurality of video streams. Each of the plurality of video streams corresponds to a respective stream portion of a scene and the plurality of video streams are combinable into a combined stream corresponding to the scene. The device has an input, for example to receive signals from a remote control or other device wirelessly, or coupled or able to be coupled to an input device such as a touch screen, eye and/or head tracker, game controller and so forth. The input is configured to receive a signal indicating an output portion of a scene to be output by the content consumption device. The output portion has less pixels in at least one dimension than the scene. The device also comprises an output interface and a processor configured to receive two or more video streams of the plurality of video streams from the receiver and to receive the signal. The processor is further configured to combine the two or more video streams to produce an output video stream corresponding to the output portion and to cause output of the output video stream by the output interface.

In some embodiments, the content consumption device does not itself display the output stream, but generates it to be displayed on a different device. For example, the output interface may be an output port like HDMI. In other embodiments, the content consumption device comprises a display to display the output stream, for example a display screen, a binocular display, a head up or head mounted display, a holographic display, and so forth.

In some embodiments, the processor is configured to determine two or more video streams each corresponding to a respective overlapping portion of the scene, overlapping the output portion. In such embodiments, receiving two or more video streams may comprise causing the receiver to selectively receive the two or more determined video streams, for example as described above. The receiver may be a broadcast receiver such as described above, for example having one or more tuners. In some embodiments, the receiver comprises two or more tuners and the processor is configured to determine if a first one of the two or more video streams is transmitted on a first channel and a second one of the two or more video streams is transmitted on a second channel and to cause the receiver to tune one of the tuners to the first channel to receive first one of the two or more video streams and to tune another one of the tuners to the second channel to receive the second one of the two or more video streams. The processor may be configured to receive from the receiver data identifying a video stream as one of the plurality of video streams and one or more adjacent video streams adjacent in the scene to the video stream and may be configured to use this information, possibly together with information identifying the stream(s) currently displayed to determine the two or more streams.

In some embodiments, the input is configured to receive an input from a user of the content consumption device as the signal or to derive the signal from the user input.

Further aspects extend to a content consumption device implementing the method(s) according to the aspects described above.

In some yet further aspects, a method of broadcasting a scene is disclosed. The method comprises broadcasting a video stream on a first broadcast channel together with data identifying the video stream as one of a plurality of video streams. Each of the plurality of video streams corresponds to a respective stream portion of the scene and the plurality of video streams is combinable into a combined stream corresponding to the scene. The video stream is broadcast together with further data identifying one or more adjacent video streams corresponding to a portion of the scene adjacent to the stream portion to which the video stream corresponds.

In some embodiments, at least one of the one or more adjacent video streams is broadcast on a second channel different from the first broadcast channels. Each broadcast channel may carry a corresponding multiplex of video streams.

Yet further aspects extend to a computer program product comprising, or a tangible computer readable medium or media encoding, computer instructions that, when executed on a computing device, implement one or more methods as described above.

With reference to FIG. 1, a content distribution system comprises a content provider 102, a communications network 104 and content consumption devices 106, each associated with a respective input device 108. The content provider distributes a plurality of scene streams that together can be combined to constitute a field of view of a scene as described below. The content consumption devices 106 receive two or more of the scene streams and combines them into an output stream of a portion of the scene that can be displayed to the user either using a build in display device or by outputting the output stream to a display device. Examples of content consumption devices are set-top boxes, smart television sets, personal computing devices, display goggles and helmets and so forth. The latter four may also be display devices for connection to a set-top box implementing the content consumption device 106.

In some specific embodiment, the content provider 102 is a broadcaster, for example a cable, satellite or over-the-air broadcaster, or a combination thereof, and the communications network 104 is correspondingly implemented by a corresponding digital broadcasting infrastructure, comprising a head-end and so forth. In such embodiments, the content consumption devices 106 comprise one or more tuners to receive corresponding video streams, or broadcast services, or multiplexes of video streams. Video streams or multiplexes of video streams are typically implemented in accordance with the MPEG-2 standard and any suitable standard, often determined by geographic location may be used for the digital broadcast infrastructure and protocols, for example DVB. In some other embodiments, rather than broadcasting the scene streams, the scene streams are provided on demand, for example from server at the content provider 102 over the Internet as the communications network 104, with the content consumption devices 106 being configured accordingly.

Irrespective of the mode of transmission of the scene streams, each content consumption device 106 is associated with at least one input device 108 to provide an input signal to the content consumption device 106, for example a remote control or another device, such as a smart phone or tablet, game controller, goggle or head mounted display and so forth. In some embodiments, the input device 108 and a display device coupled to the content consumption device 106 may be one and the same, for example a goggle or head mounted display with built in eye tracker and/or head tracker to provide an input signal to the content consumption device 108. The input signal is used by the content consumption device as a navigational signal to navigate within the scene, that is to determine an output stream that corresponds to a portion of the scene that is displayed and/or changes in accordance with the navigational signal as described further below.

Figures 2A, 2D:
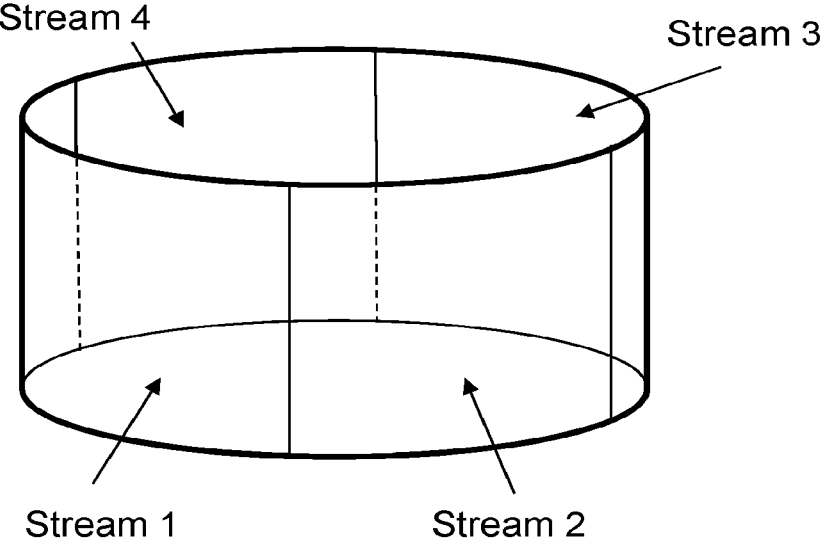

With reference to FIG. 2A, an example of a scene comprises a 360° cylindrical field of view split into four scene streams (streams 1 to 4). Each of the streams may be of a format and resolution that can be displayed by an intended recipient content consumption device/display device, for example SD, HD, UHD, 4K, and so forth. This means that the overall scene can have an overall resolution that could not be handled by the content consumption device, and that, in embodiments where the scene streams are transmitted separately, each transmission requires less bandwidth than would be needed to transmit the whole scene in one go.

FIG. 2D illustrates a corresponding data structure identifying the four scene streams making up the scene as scene streams, as well as their relationship to each other, for example indicating for stream 1 that stream 4 is the right neighbour or adjacent stream and stream 2 is the left neighbour or adjacent stream, noting that the view point for the scene is at the centre of the cylinder illustrated in FIG. 2A. The data structure may be transmitted by the content provider 102 in any suitable way, for example embedded in the video streams, embedded in each ES, embedded in each TS, for example in a PMT, and so forth, in an MPEG-2 context. In a DVB implementing system, the data structure may be distributed, for example, in a SDT or EIT in addition or instead of in a PMT. The streams may be identified by service id, program number, PID or any other suitable identifier. Equally the data structure may be distributed, for example the record pertaining to stream 1 may be embedded in stream 1, the data pertaining to stream 2 may be embedded in stream 2 and so forth. In other words, each stream may carry the data about its adjacent streams.

Figures 2B, 2E:
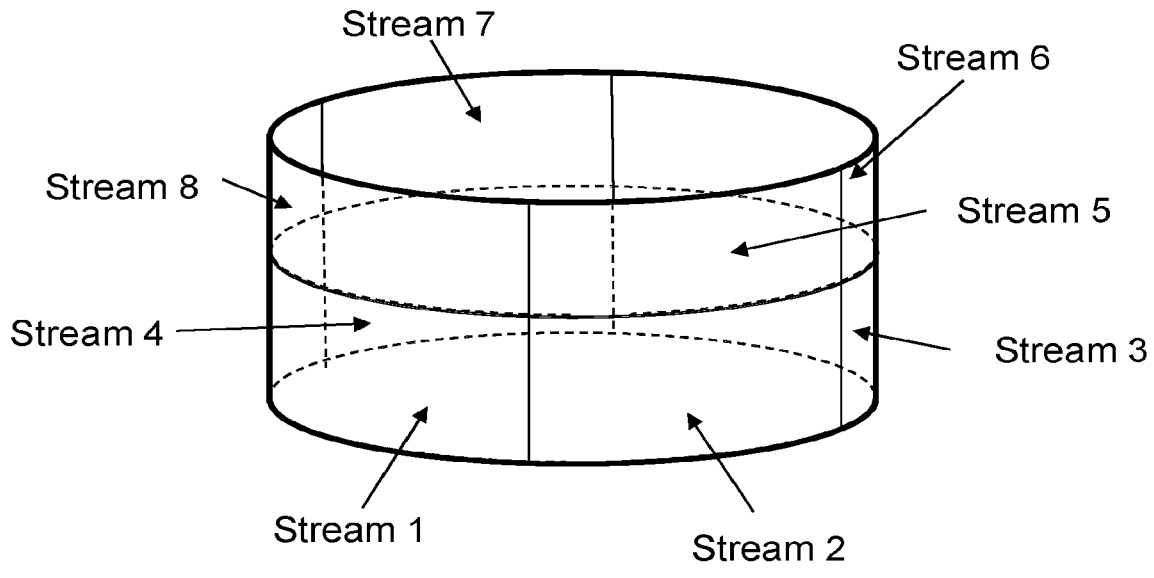

FIG. 2B illustrates another example of a scene that comprises a 360° cylindrical field of view split into eight, rather than four scene streams (streams 1 to 8). The scene streams are arranged in two rows of four streams each (streams 1 to 4 below and streams 5 to 8 above). In this way a scene resolution of eight times the scene stream resolution (rather than four times) can be achieved. To reconstruct a portion of the scene to be displayed/output that is of the same size as the scene streams, four, rather than two, scene streams will be required to reconstruct the portion of the scene in the general case. Considering that many modern set-top boxes provide three or more tuners and that each tuner can receive multiple streams in a multiplex, this will not be problematic even in many broadcast contexts. A corresponding data structure is illustrated in FIG. 2E and the disclosure above in relation to FIG. 2D applies analogously. The person skilled in the art will appreciate that many other arrangements of scene streams to constitute a scene are equally possible, for example arrangements with three or more rows, arrangements with more streams in each row, and so forth, and that the described data structures can readily be adapted for such contexts. Likewise, other arrangements of scene streams and data structures with corresponding frames of reference, such as hemispherical fields of view with scene streams tiled in a domed arrangement and neighbours identified by compass directions, or spherical or part-spherical fields of view, are equally within easy reach of the person skilled in the art.

Figure 2C:
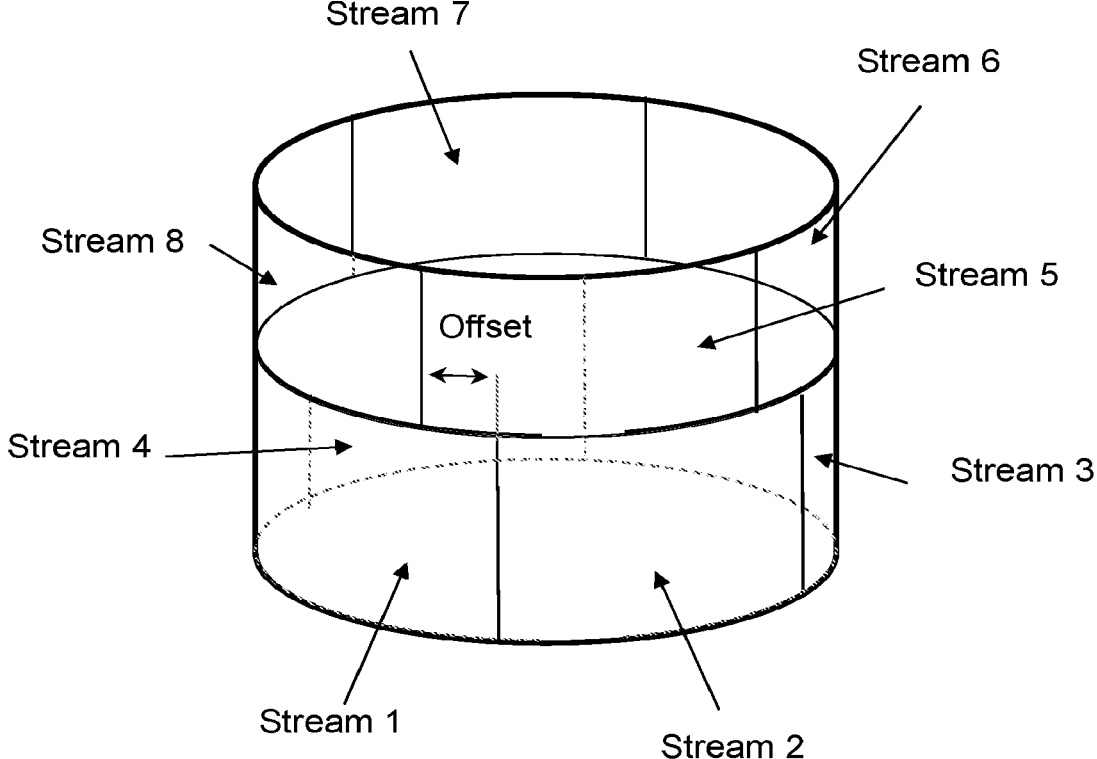

Yet another example of a scene that comprises a 360° cylindrical field of view with two rows of streams, but may be generalised to any number of rows and streams, as well as other layouts such as hemispherical or full or partial spherical, is illustrated in FIG. 2C. A corresponding data structure is illustrated in FIG. 2F. In this example, the rows are off-set relative to each other, in the specific example by 200 pixels, and this is indicated in the data structure so that portions of streams to be combined can be properly aligned taking account of the off-set. It will be appreciated that other embodiments may have a vertical rather than a horizontal off-set and that, depending on the desired field of view, horizontal and vertical directions may be used interchangeably as appropriate for each application, irrespective of the specific arrangement of scene streams.

Figure 3:
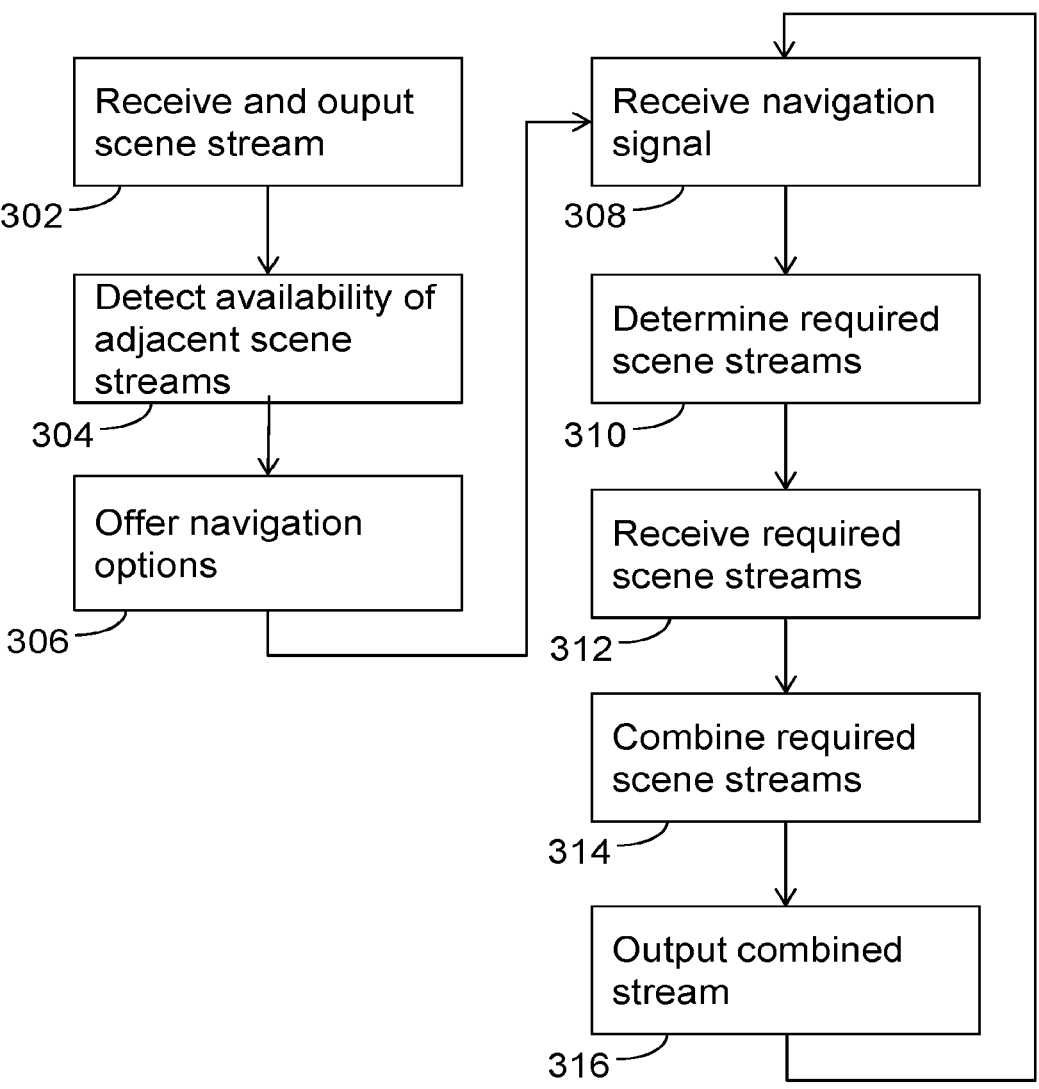
FIG. 3 illustrates a method of combining scene video streams responsive to a navigation signal.

With reference to FIG. 3, a process, carried out at a content consumption device, for example a content consumption device 106 as described above and/or further detailed below, of producing and outputting an output stream corresponding to a portion of a scene begins with a step 302 of receiving and outputting a scene stream. The process is carried out at a content consumption device, for example a content consumption device 106 as described above and/or further detailed below. The stream may, for example, be a stream that is displayed by default when tuning to a service featuring the scene in a broadcast context. At step 304 the availability of adjacent scene streams is detected, for example a signal is detected that signals that the received stream is a scene stream, that is it is part of a plurality of streams that correspond to a scene as described above. In response, a viewer of the stream is offered navigation options to navigate within the scene, for example providing a prompt to the user explaining how to navigate within the scene, for example using directional keys of a remote control or as described above.

Steps 302 to 306 may be omitted or replaced by other steps. For example, the navigation options may be available without prompting the user and the scene stream (or a number of scene streams) may be received prompted by a different mechanism, for example causing tuning to the appropriate service when a user starts a scene navigation application.

At step 308, a navigation signal is received, for example as described above. The navigation signal may specify a specific position in a specific scene screen, for example a pixel coordinate in the specific scene screen to be aligned with a position, for example the centre, of the display on which the output stream is destined to be displayed. The pixels of the output stream not covered by the specific scene stream in the desired position can then be filled with pixels from the relevant adjacent scene stream(s) in the applicable direction, as determined based on the received data. Alternatively, the navigation signal may indicate a desired position in the scene for the output stream at, say, the centre of the display and the scene streams to be combined to form the output stream can then be determined accordingly. In some embodiments, the navigation signal may indicate a change in the current position of the field of view, rather than an absolute position.

At step 310, the scene streams that are required to produce the output stream are determined and the determined scene streams are received at step 312, for example selectively receiving only the required scene streams or the required scene streams and scene streams determined to be adjacent to the required scene streams in accordance with the received data, for example as illustrated in FIGS. 2A-F. In a broadcast context, receiving may comprise tuning respective tuner(s) to receive respective multiplex(es) that contain the required streams. It will appreciated that if the required streams are already being received or have been buffered, no additional receiving step may be needed.

At step 314, the determined scene streams are combined to form the output stream. For example, the pixel arrays of the individual streams may be appropriately concatenated in accordance with the received data and the result cropped to produce the output stream, or pixels of the output stream may be filed with appropriately cropped pixels from the required scene streams. Depending on the preparation of the scene streams, an amount of overlap and/or misalignment may need to be accounted for and in some embodiments conventional stitching algorithms such as described in the background above may be used to form the output stream from the scene streams. Once the output stream has been produced at step 314, it is output by the content consumption device at step 316, for example through an HDMI or other video output port, wirelessly, for example over a WIFI local area network connection or via Bluetooth™ or by display on a display device of the content consumption device. The process then loops back to step 308 to receive further navigation inputs, until the scene functionality is switched off or the user tunes to a different service, for example.

Figure 4:
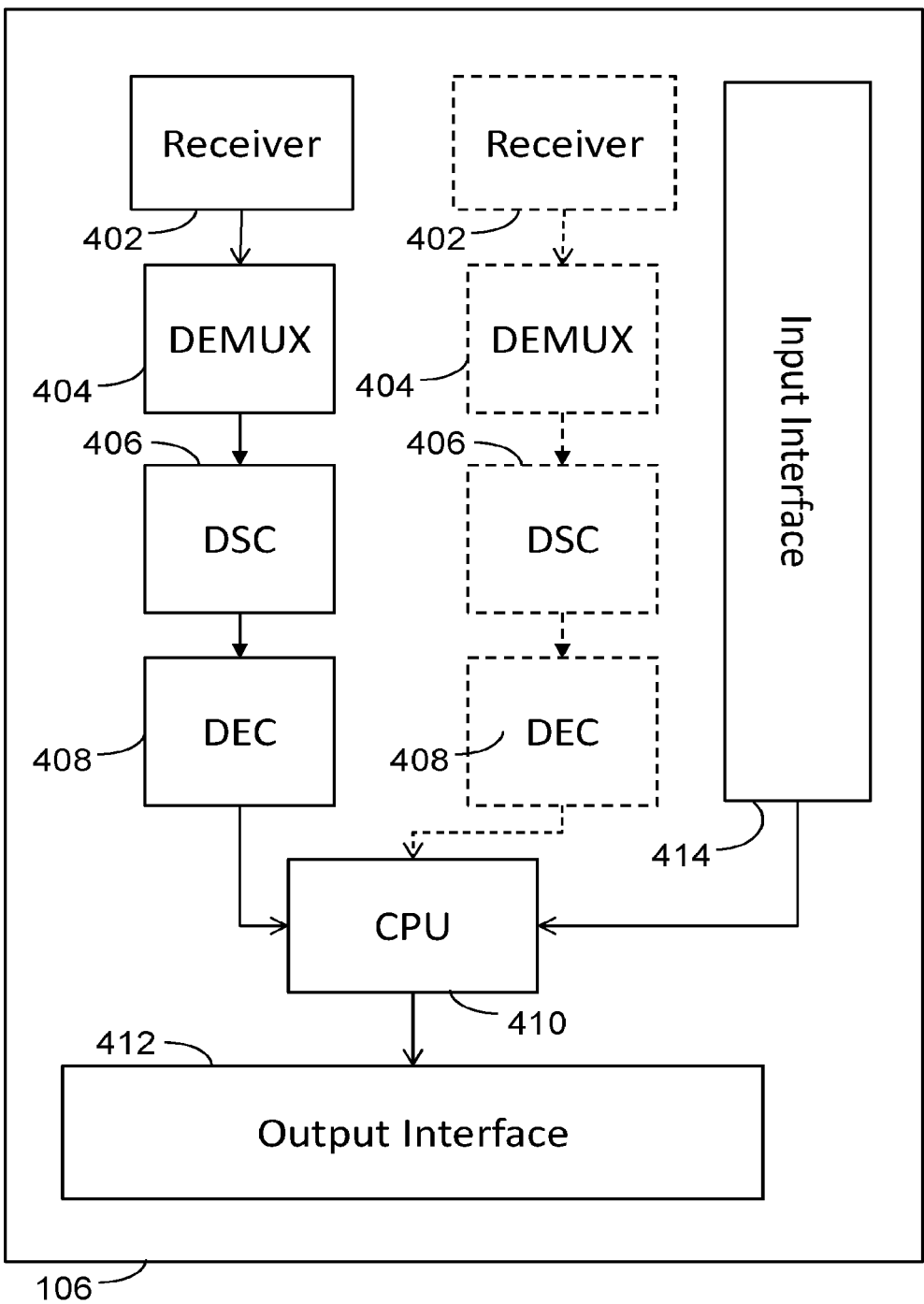
FIG. 4 illustrates an implementation of a content consumption device in the content distribution system.

With reference to FIG. 4, a specific embodiment of a content consumption device comprises one or more receivers 402, typically comprising a tuner each in a broadcast setting. A demultiplexer 404 is coupled to the receiver to demultiplex a received TS and extract individual ES, or other video streams, and other data. If the content consumption device has a conditional access system or other content scrambling/protection system, a descrambler 406 is connected to the demultiplexer 404 to descramble the streams. A video processor 408 creates video frames from the received stream and is coupled to a processor 410 to process the video frames and output a combined output stream (or sequence of frames), as described above, to an output interface 412, for example a display or display or video port, for example as described above. The processor 412 is also coupled to an input interface 414, for example as described above. The processor 412, in co-operation with the other required components of the content consumption device is configured to implement a method as described above with reference to FIG. 3.

Figure 5:
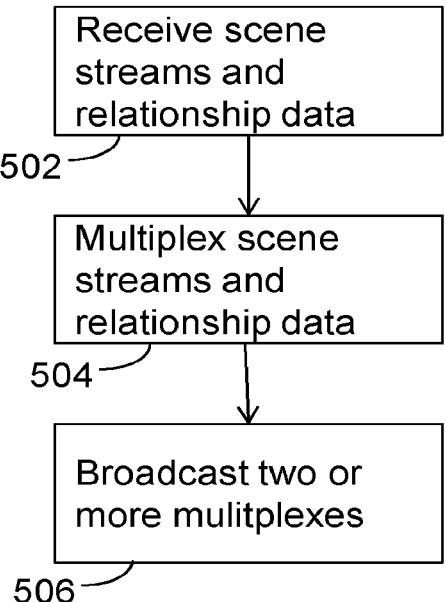
FIG. 5 illustrates a method of distributing scene streams.

With reference to FIG. 5, a process of distributing a video of a scene constituted by scene streams as described above comprises a step of 502 of receiving scene streams and data about their neighbourhood relationships, for example as disclosed above and implemented by content provider 102. The scene streams and data may be received from a separate provider, from an arrangement of a plurality of capture devices, for example video cameras, or in any other suitable fashion. Captured streams may be stitched together as is known and the resulting scene may then be split into scene streams. Alternatively, captured streams may be used directly. At step 504, the scene streams are multiplexed into one or more, typically two or more, multiplexes, together with the relationship data in a format as described above and the multiplexes are broadcast at step 506, over cable, satellite, over-the-air, or the Internet. In particular although not exclusively in the last case, video streams may be broadcast individually instead of in multiplexes.

Figure 6:
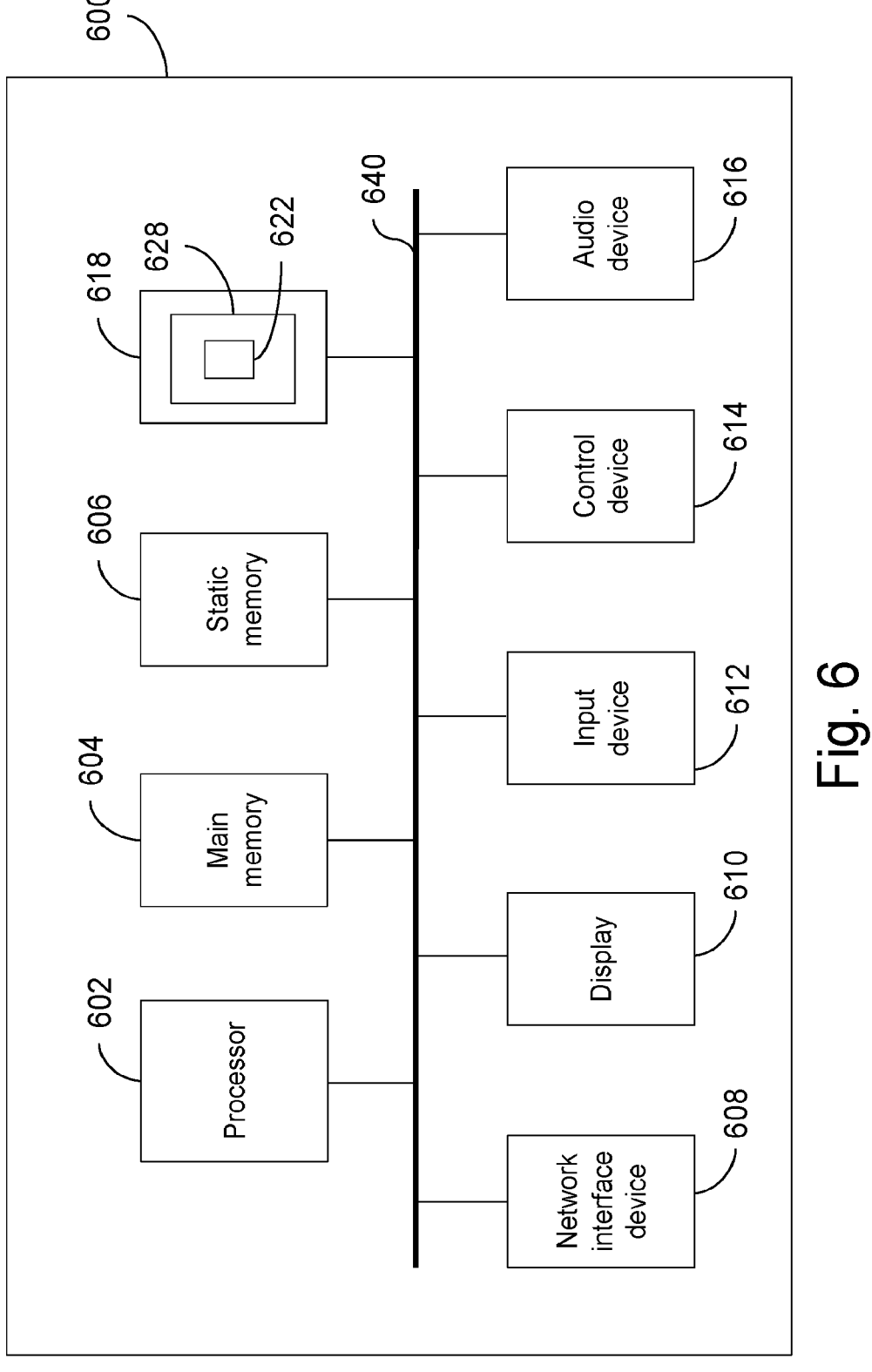
FIG. 6 illustrates a computing platform.

FIG. 6 illustrates a block diagram of one implementation of a computing device 600 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein. The computing device may comprise or be embodied in a secure element to provide secure computations isolated from other parts of a computing device in which the secure element is embedded. The computing device may be a system on chip.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 630.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 622) for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard or touchscreen), a cursor control device 614 (e.g., a mouse or touchscreen), and an audio device 616 (e.g., a speaker).

The data storage device 618 may include one or more machine-readable storage media (or more specifically one or more non-transitory computer-readable storage media) 628 on which is stored one or more sets of instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable storage media.

The example computing device 600 may comprise, or implement, a content consumption device implementing the methods described above. For example, the computing device 600 may comprise or implement a content consumption device 106, 400 as described above with reference to FIGS. 1 and 4.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAS, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hard-wired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying", "computing", "generating", "obtaining" or the like, refer to the actions and processes of a computer system, or similar electronic computing device, that manipulates and transforms data represented as physical (electronic)

quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A content-consumption device comprising:
at least one memory; and
at least one processor coupled to the at least one memory and configured to:
receive two or more video streams of a plurality of video streams, each video stream of the plurality of video streams corresponding to a respective field of view of a scene, wherein the plurality of video streams are combinable into a combined stream corresponding to the scene;
receive a signal indicating an output portion of the scene to be output by the content-consumption device, wherein the output portion corresponds to a reduced field of view, the reduced field of view being smaller than a field of view associated with the combined stream;
combine the two or more video streams to produce an output video stream corresponding to the output portion, the output video stream corresponding to the reduced field of view; and
output the output video stream.

2. The content-consumption device of claim 1, wherein the at least one processor is configured to:
determine a field of view of a display device; and
determine the output portion of the scene based on the field of view of the display device.

3. The content-consumption device of claim 2, wherein the display device comprises a head-mounted display.

4. The content-consumption device of claim 3, wherein determining the field of view of the display device comprises tracking an orientation the head-mounted display.

5. The content-consumption device of claim 2, wherein the content-consumption device comprises the display device.

6. The content-consumption device of claim 2, wherein the display device is separate from the content-consumption device and wherein, to output the output video stream, the at least one processor is configured to cause at least one transmitter to transmit the output video stream to the display device.

7. A content-consumption device comprising:
at least one memory; and
at least one processor coupled to the at least one memory and configured to:
receive two or more video streams of a plurality of video streams, each video stream of the plurality of video streams corresponding to a respective field of view of a scene, wherein the plurality of video streams are combinable into a combined stream corresponding to the scene;
obtain a field of view of a display device, wherein the field of view of the display device is smaller than a field of view associated with the combined stream;
combine the two or more video streams to produce an output video stream corresponding to the field of view of the display device; and
output the output video stream to the display device.

8. The content-consumption device of claim 7, wherein the display device comprises a head-mounted display.

9. The content-consumption device of claim 8, further comprising determining the field of view of the display device by tracking an orientation the head-mounted display.

10. The content-consumption device of claim 7, wherein the content-consumption device comprises the display device.

11. The content-consumption device of claim 7, wherein the display device is separate from the content-consumption device and wherein, to output the output video stream to the display device, the at least one processor is configured to cause at least one transmitter to transmit the output video stream to the display device.

12. A method of processing video streams at a content-consumption device, the method comprising:
receiving two or more video streams of a plurality of video streams, each video stream of the plurality of video streams corresponding to a respective field of view of a scene, wherein the plurality of video streams are combinable into a combined stream corresponding to the scene;
receiving a signal indicating an output portion of the scene to be output by the content-consumption device, wherein the output portion corresponds to a reduced field of view, the reduced field of view being smaller than a field of view associated with the combined stream;
combining the two or more video streams to produce an output video stream corresponding to the output portion, the output video stream corresponding to the reduced field of view; and
outputting the output video stream.

13. The method of claim 12, further comprising:
determining a field of view of a display device; and
determining the output portion of the scene based on the field of view of the display device.

14. The method of claim 13, wherein the display device comprises a head-mounted display.

15. The method of claim 14, wherein determining the field of view of the display device comprises tracking an orientation the head-mounted display.

16. The method of claim 13, wherein the content-consumption device comprises the display device.

17. The method of claim 13, wherein the display device is separate from the content-consumption device and wherein outputting the output video stream comprises transmitting the output video stream to the display device.

18. A method of processing video streams at a content-consumption device, the method comprising:
receiving two or more video streams of a plurality of video streams, each video stream of the plurality of video streams corresponding to a respective field of view of a scene, wherein the plurality of video streams are combinable into a combined stream corresponding to the scene;

obtaining a field of view of a display device, wherein the field of view of the display device is smaller than a field of view associated with the combined stream;

combining the two or more video streams to produce an output video stream corresponding to the field of view of the display device; and outputting the output video stream to the display device.

19. The method of claim 18, wherein the display device comprises a head-mounted display.

20. The method of claim 19, further comprising determining the field of view of the display device by tracking an orientation the head-mounted display.

* * * * *